United States Patent [19]

Henry

[11] Patent Number: 4,473,734
[45] Date of Patent: Sep. 25, 1984

[54] MODULAR WELDING APPARATUS

[75] Inventor: Dale V. Henry, Willow Street, Pa.

[73] Assignee: RCA Corporation, New York, N.Y.

[21] Appl. No.: 424,440

[22] Filed: Sep. 27, 1982

[51] Int. Cl.³ .............................................. B23K 11/00
[52] U.S. Cl. ................................ 219/86.8; 219/86.25; 219/89
[58] Field of Search ..................... 219/86.25, 86.8, 89, 219/119, 61.1, 160, 158

[56] References Cited

U.S. PATENT DOCUMENTS

| | | | |
|---|---|---|---|
| 1,434,374 | 11/1922 | De Lemon et al. | 219/86.25 |
| 2,021,477 | 11/1935 | Bohn | 219/91.21 |
| 2,476,454 | 7/1949 | Reed | 219/86.8 |
| 2,850,619 | 9/1958 | De Lucia | 219/89 |
| 3,148,264 | 9/1964 | Clark, Jr. et al. | 219/86.8 |

Primary Examiner—C. L. Albritton
Assistant Examiner—Catherine M. Sigda
Attorney, Agent, or Firm—Eugene M. Whitacre; Dennis H. Irlbeck; Vincent J. Coughlin, Jr.

[57] ABSTRACT

A modular welding apparatus comprises a welding head assembly having a welding head with an integral actuating assembly. A foot treadle initiates motion of the welding head. A conductive base member is spaced from the welding head. A welding power supply has one lead connected to the welding head and a second lead connected to the base member. An interchangeable welding module is disposed on the base member in electrical contact therewith. The welding module includes a conductive support plate and a locking cam for detachably attaching the support plate to the base member. A welding mandrel comprising one welding electrode is in contact with the support plate. An insulating member is attached to the support plate and an articulated welding electrode assembly is attached to the insulating member. The articulated welding electrode assembly is in communication with the actuating assembly whereby the articulated welding electrode assembly may be activated to abut the welding mandrel in precise alignment therewith.

13 Claims, 9 Drawing Figures

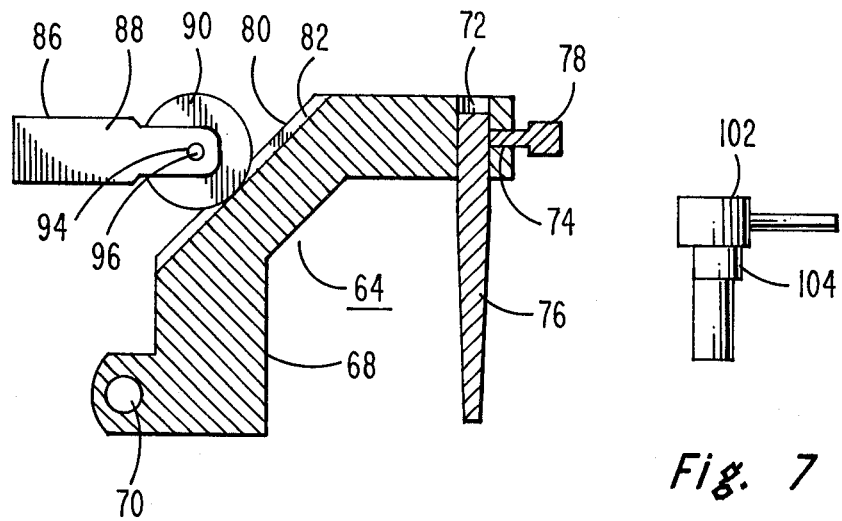
Fig. 6
Fig. 7
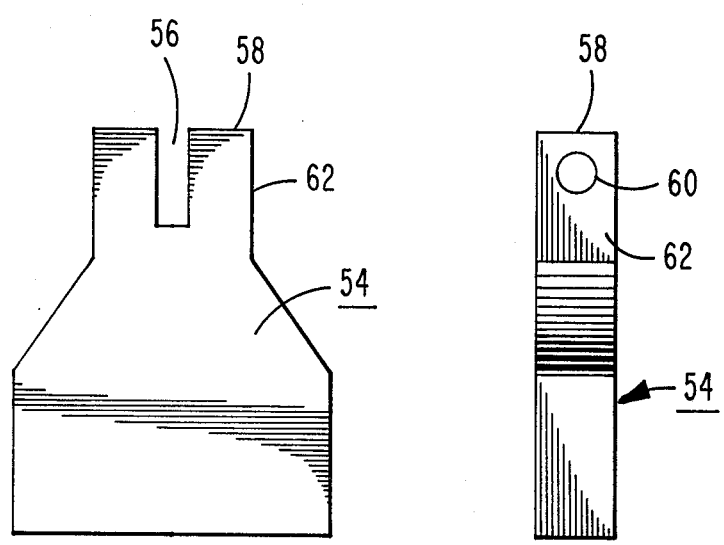
Fig. 8
Fig. 9

MODULAR WELDING APPARATUS

BACKGROUND OF THE INVENTION

The present invention relates to electrical resistance welding and, more particularly, to a welding apparatus having interchangeable welding modules.

U.S. Pat. No. 2,850,619 issued to M. S. De Lucia on Sept. 2, 1958 shows an electric resistance welder having two welding electrodes. The electrodes are generally designed to perform a number of different welding operations; however, depending on the shape of the parts to be welded, it is often necessary to replace one or both of the electrodes with electrodes that are specially configured to perform a particular welding operation. The changing of welding electrodes and the alignment of the electrodes after such a change are time consuming and inefficient. It is therefore desirable to be able to change electrodes rapidly to perform a number of different welding operations requiring different electrode configurations, and to effect the electrode change without requiring realignment of the welding electrodes.

SUMMARY OF THE INVENTION

A modular welding apparatus comprises a welding head assembly having a welding head with actuating means integral therewith. Motive means initiate motion of said welding head. A conductive base member is spaced from said welding head. Means are provided for connecting a first potential to said welding head and a second potential to said base member. An interchangeable welding module is disposed on said base member in electrical contact therewith. The interchangeable welding module includes a conductive support plate and locking means for detachably attaching said support plate to said base member. A welding mandrel is in contact with said support plate. An insulating member is attached to said support plate and an articulated welding electrode assembly is attached to said insulating member. The articulated welding electrode assembly is in communication with said actuating means whereby said articulated welding electrode assembly may be activated to abut said welding mandrel in precise alignment therewith.

BRIEF DESCRIPTION OF THE DRAWINGS

FIG. 6 is a partial cross-sectional view of an articulated welding electrode assembly in communication with an actuating assembly of FIG. 3.

FIG. 7 is a plan view of a locking member of FIGS. 2 and 3.

FIG. 8 is a plan view of an insulative vertical member.

FIG. 9 is a side view of the insulative vertical member of FIG. 8.

DETAILED DESCRIPTION OF THE PREFERRED EMBODIMENT

Figure 1:
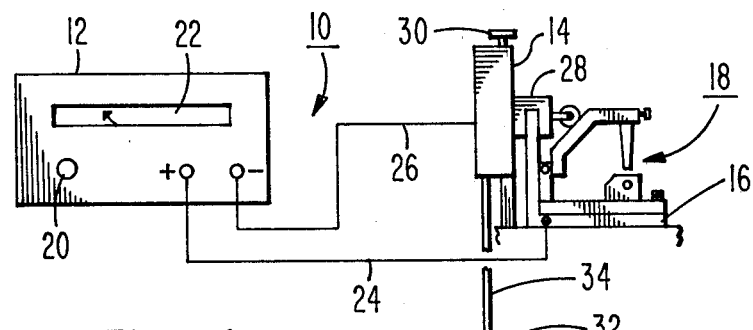
FIG. 1 is a schematic diagram of a welding apparatus according to the present invention.

As shown in FIG. 1, a modular electrical resistance welding apparatus 10 comprises a power supply 12, a welding head assembly 14, a conductive base member 16 and an interchangeable welding module 18. The power supply 12 and the welding head assembly 14 are conventional and need not be described in detail. The power supply 12 includes a welding current adjustment knob 20, a welding current meter 22 and a pair of power-output cables 24 and 26, respectively. In the present structure, the positive power cable 24 is connected to the base member 16 and the negative power cable 26 is connected to the welding head assembly 14. The welding head assembly 14 includes a welding head 28 and a welding pressure adjustment wheel 30. A foot treadle 32 is connected by a connecting arm 34 to the welding head assembly 14 to cause the welding head 28 to move up and down in a reciprocating manner.

Figure 2:
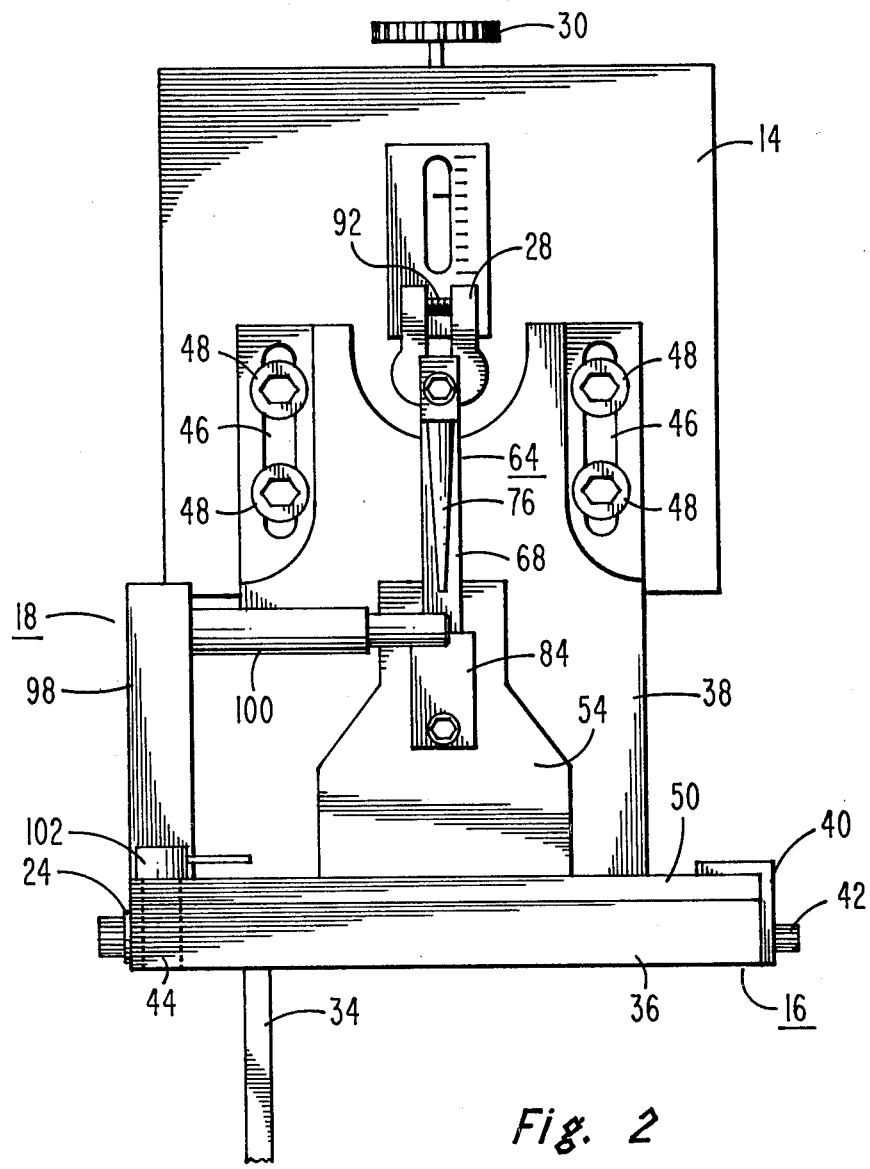
FIG. 2 is a front elevational view of a welding head assembly and an embodiment of the novel welding module.
Figure 3:
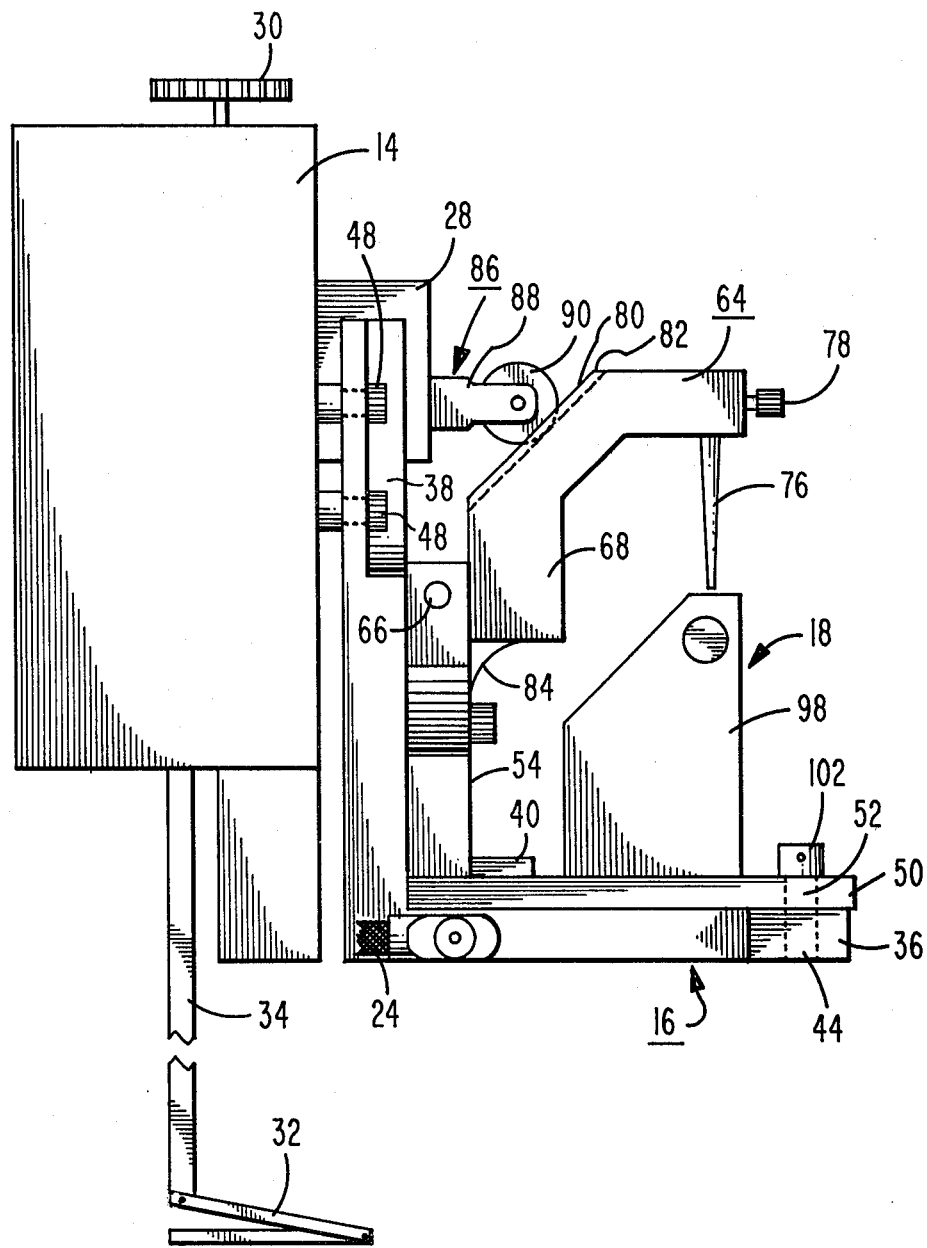
FIG. 3 is a side elevational view of the welding head assembly and module of FIG. 2.

As shown in FIGS. 2 and 3, one embodiment of a welding module 18 is disposed on the conductive base member 16. The base member 16 comprises a metal base plate 36 and an upright metal support member 38. The base plate 36 has an alignment stop member 40 attached to one side thereof. The stop member 40 may be secured to the base plate 36 by a bolt 42 or it may be permanently attached thereto, for example by welding. An alignment hole 44, shown in phantom, is provided in the base plate 36 adjacent to the opposite side of the base plate to which the alignment stop member 40 is attached. The positive power cable 24 is secured to one side of the base plate 36. The upright support member 38 is attached to the base plate 36. A pair of elongated slots 46 are formed in the upright support member 38 adjacent to the upper sides thereof. A plurality of bolts 48 extend through the slots 46 to attach the base member 16 to the welding head assembly 14 and to align it therewith.

The interchangeable welding module 18 comprises a conductive support plate 50 in electrical contact with the base plate 36. A support plate alignment hole 52, shown in phantom, is provided in the support plate 50. The support plate alignment hole 52 is slightly larger in diameter than the alignment hole 44 formed in the base plate 36. An insulative vertical member 54 is affixed to the upper surface of the conductive support plate 50. As shown in FIG. 8, a narrow vertical channel 56 is formed through a top surface 58 of the insulative vertical member 54. A circular aperture 60, shown in FIG. 9, is provided through an upper sidewall 62 of the insulative vertical member 54. The aperture 60 intersects the vertical channel 56. An articulated welding electrode assembly 64 is loosely disposed within the vertical channel 56 and attached to the insulative vertical member 54 by a dowel pin 66 that provides an interference fit with the sidewall 62 encircling the aperture 60.

As shown in FIG. 6, the articulated welding electrode assembly 64 comprises a conductive upper electrode holder 68 having a transversely disposed pivotal aperture 70 formed in the proximal end thereof. A welding electrode receiving aperture 72 is formed in the distal end of the electrode holder 68. The receiving aperture 72 is intersected by a threaded screw hole 74. A welding electrode 76 is fitted within the electrode receiving aperture 72 and secured therein by a thumb screw 78. A rear facing inclined surface 80 of the upper electrode holder 68 is provided with a shallow generally U-shaped channel 82 for a purpose to be described hereinafter. The pivotal aperture 70 has a diameter slightly larger than the diameter of the dowel pin 66 to permit the upper electrode holder to move freely on the dowel pin 66. A strip 84 of resilient material, such as spring steel, shown in FIGS. 2 and 3, is secured between the insulative vertical member 54 and a portion of the bottom surface of the upper electrode holder 68. The resilient strip 84 provides a restoring force to urge the articulated welding electrode assembly 64 upward. An actuating assembly 86 comprising a conductive support rod 88 and a conductive wheel 90 is securely attached within the welding head 28 by a retaining screw 92. The retaining screw 92 clamps the proximal end of the support rod 88 to the welding head 28. The distal end of the support rod has a wheel slot (not shown) formed therein which extends a distance into the rod 88. A rod aperture 94 extends through the distal end of the support rod 88 and intersects the wheel slot. The wheel 90 having a centrally disposed aperture (not shown) is secured to the support rod 88 by a wheel pin 96 which is in interference fit with the support rod surrounding the rod aperture 94. A lower electrode holder 98 is attached to the upper surface of the conductive support plate 50. A lower welding electrode mandrel 100 is affixed to the lower electrode holder 98 and is oriented to align with the upper welding electrode 76. The alignment can be performed without affixing the module 18 to the base member 16 so that no manufacturing time is lost during electrode alignment.

With reference to FIGS. 2 and 3, the welding module 18 is placed on the base member 16 and a locking cam 102, shown in FIG. 7, is disposed through the aligned support plate alignment hole 52 and the base plate alignment hole 44. The locking cam includes an eccentric locking portion 104. The locking cam 102 is turned until the locking portion 104 urges the support plate 50 against the alignment stop member 40. When the support plate 50 is properly locked in position, the wheel 90 of the actuating assembly 86 is disposed within the shallow U-shaped channel 82 of the upper electrode holder 68. The actuating assembly 86 electrically connects the articulated welding electrode assembly 64 to the welding head assembly 14. A work-piece (not shown), e.g., a cylindrical member having a stepped-down portion with an overlapping seam, is disposed over the lower welding electrode mandrel 100. The foot treadle 32 is depressed causing the welding head 28 to move in a downward direction. The wheel 90 of the actuating assembly 86 rolls in the shallow channel 82 forcing the articulating welding assembly 64 downward toward the workpiece supported on the lower welding electrode mandrel 100. The foot treadle 32 is depressed until a pressure sensitive switch (not shown) triggers the welding current pulse. When the foot treadle 32 is released, the resilient strip 84 which is compressed against the bottom surface of the upper electrode holder 68 forces the articulated welding electrode assembly 64 upward to its original position.

Figure 4:
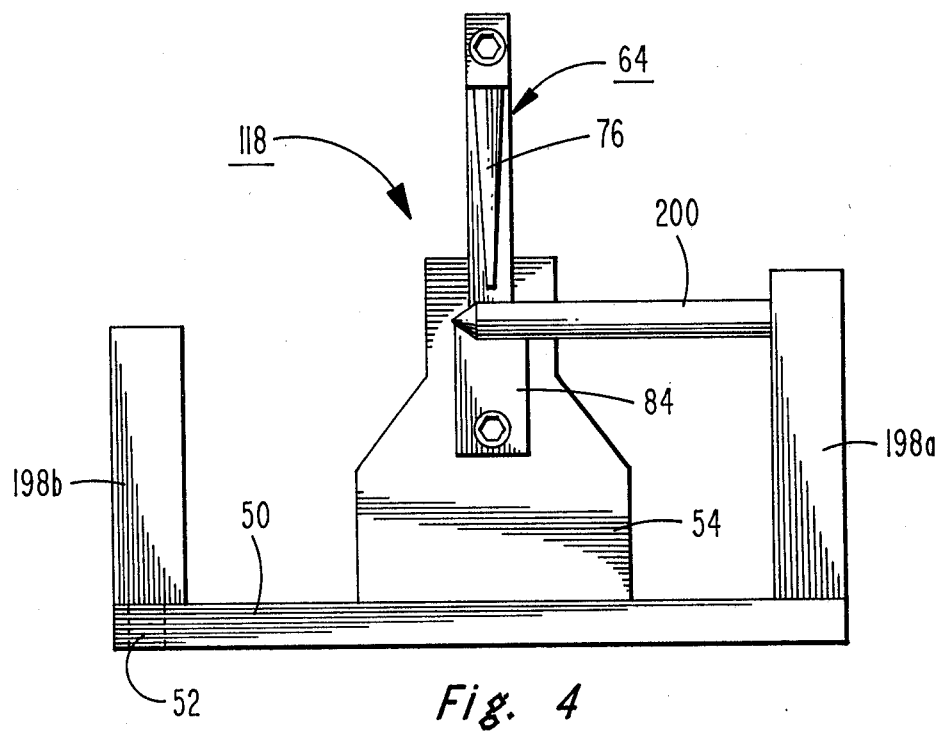
FIG. 4 is a front elevational view of an alternative embodiment of the novel welding module.
Figure 5:
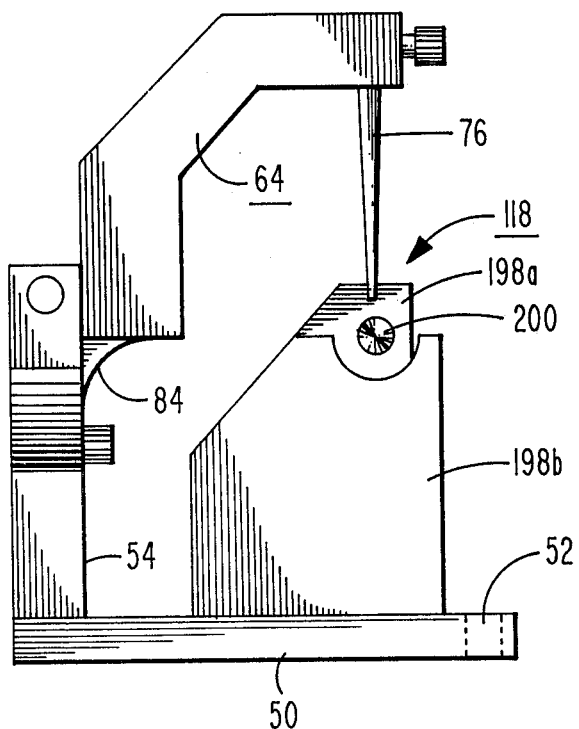
FIG. 5 is a side elevational view of the welding module of FIG. 4.

An alternative welding module 118 is shown in FIGS. 4 and 5. The welding module 118 is similar to the aforedescribed welding module 18 differing only in that a two piece lower welding electrode holder 198 comprising a first electrode holder 198a and a second support member 198b is attached to the support plate 50. A lower welding electrode mandrel 200 having a substantially constant diameter is affixed to the first electrode holder 198a. The lower electrode 200 is prealigned with the upper welding electrode 76. By loosening the locking cam 102 and removing it from the alignment holes 52 and 44, the welding module 18 can be replaced by the alternative welding module 118 without extensive realignment of electrodes.

The aforedescribed welding modules permit a welding apparatus to perform a great number of welding tasks requiring different electrode configurations. While the two examples provided herein utilize the same upper welding electrode 76, it should be clear that other shapes of upper electrodes can be used in conjunction with complementary lower welding electrode mandrels. Additionally, the lower electrode mandrels need not be attached to the support plate 50, but they may be free to rotate or otherwise move relative to the articulated welding electrode assembly 64 as long as the alignment therewith is maintained, e.g. by reference blocks or guides fixed to the support plate. In the event that high welding currents are to be utilized, an auxiliary current carrying strap (not shown) may be connected between the welding head 28 and the articulated welding electrode assembly 64.

What is claimed is:

1. A modular welding apparatus comprising:
   a welding head assembly having a welding head with actuating means integral therewith;
   means for activating said welding head;
   a conductive base member spaced from said welding head, said base member including base alignment means;
   means for connecting a first potential to said welding head;
   means for connecting a second potential to said base member; and
   an interchangeable welding module including
   a conductive support plate disposed on said base member and in electrical contact therewith said support plate including alignment means for aligning said support plate with said base member,
   locking means for detachably attaching said support plate to said base member,
   a pair of pre-aligned welding electrodes including a welding mandrel and an articulated welding assembly,
   said welding mandrel being in contact with said support plate,
   an insulating member attached to said support plate, and
   said articulated welding electrode assembly being attached to said insulating member and in communication with said actuating means, said articulated welding electrode assembly being activated by said actuating means to abut said welding mandrel in precise alignment therewith.

2. The apparatus described in claim 1, wherein said actuating means includes an actuating assembly.

3. The apparatus described in claim 2, wherein said actuating assembly comprises a conductive support rod having a conductive wheel secured thereto.

4. The apparatus described in claim 1, wherein said conductive base member includes a metal base plate and an upright metal support member.

5. The apparatus described in claim 4, wherein said base alignment means includes an alignment stop member and a base plate alignment hole.

6. The apparatus described in claim 1, wherein said plate alignment means of said welding module includes a support plate alignment hole.

7. The apparatus described in claim 6, wherein said locking means comprises a locking cam disposed within said base plate alignment hole and said support plate alignment hole and having an eccentric portion which contacts said support plate and urges said support plate against said alignment stop member.

8. The apparatus described in claim 1, wherein said insulating member includes a narrow channel intersected by a circular aperture, said articulated welding electrode being disposed within said narrow channel and retained therein by a dowel pin that provides an interference fit with the insulating member encircling said circular aperture.

9. The apparatus described in claim 1, wherein said articulated welding electrode assembly includes a conductive electrode holder with a welding electrode detachably secured thereto.

10. The apparatus described in claim 9, wherein said electrode holder includes a proximal end and a distal end, said proximal end having a transversely disposed pivoted aperture formed therein, said distal end having a welding electrode receiving aperture formed therein, and said electrode holder having a surface with a shallow U-shaped channel therein for receiving said actuating means.

11. The apparatus described in claim 1, further including restoring means in contact with said articulated welding electrode assembly.

12. The apparatus described in claim 11, wherein said restoring means comprises a resilient member in contact with said articulated welding electrode assembly.

13. In a welding apparatus comprising a welding assembly having a welding head with an actuating assembly securely attached thereto, means for activating said welding head, a conductive base member spaced from said welding head, a pair of welding electrodes, and a power supply adapted to provide a first potential to said welding head and a second potential to said base member, the improvement comprising said actuating assembly including a conductive support rod having a conductive wheel attached thereto, said rod being attached within said welding head, said base member having an alignment stop and a base alignment aperture therein, an interchangeable welding module including a conductive support plate disposed on and in electrical contact with said base member, said support plate having a support plate alignment aperture therein, said plate alignment aperture being aligned with said base alignment aperture, a locking cam disposed within said aligned apertures and having an eccentric portion which contacts said support plate and urges said support plate against said alignment stop of said base member, one of the welding electrodes of said pair of welding electrodes comprising a lower welding electrode electrically connected to said support plate, an insulating member attached to said support plate, the other electrode of said pair of electrodes comprising an articulated electrode assembly including a conductive upper electrode holder and an upper welding electrode, said electrode holder having a proximal end and a distal end, said proximal end being pivotably attached to said insulating member, said distal end including means for securing said upper welding electrode thereto in prealignment with said lower welding electrode, said electrode holder having an inclined surface with a channel therein to accommodate said conductive wheel of said actuating assembly, said articulated welding electrode assembly being activated by said wheel of said actuating assembly to bring the upper welding electrode into precisely aligned abutment with the lower welding electrode, and a resilient member disposed between said insulative member and said articulated welding electrode assembly to return said articulated welding electrode assembly to its original position.

* * * * *